(12) United States Patent
Kang et al.

(10) Patent No.: US 12,491,947 B2
(45) Date of Patent: Dec. 9, 2025

(54) BODY FOR VEHICLE

(71) Applicants: Hyundai Motor Company, Seoul (KR); Kia Corporation, Seoul (KR)

(72) Inventors: Seung Min Kang, Hwaseong-si (KR); Joo Nam Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 394 days.

(21) Appl. No.: 18/178,971

(22) Filed: Mar. 6, 2023

(65) Prior Publication Data

US 2024/0149952 A1    May 9, 2024

(30) Foreign Application Priority Data

Nov. 3, 2022   (KR) .................. 10-2022-0145272

(51) Int. Cl.
  *B62D 23/00*   (2006.01)
  *B62D 25/04*   (2006.01)
  *B62D 25/06*   (2006.01)
  *B62D 25/08*   (2006.01)
  *B62D 27/02*   (2006.01)

(52) U.S. Cl.
  CPC ......... *B62D 27/023* (2013.01); *B62D 23/005* (2013.01); *B62D 25/04* (2013.01); *B62D 25/06* (2013.01); *B62D 25/081* (2013.01)

(58) Field of Classification Search
  CPC .... B62D 23/005; B62D 27/023; B62D 25/04; B62D 25/08; B62D 25/081; B62D 25/02
  USPC .......... 296/205, 29, 30, 193.06, 9, 203.01, 2
  See application file for complete search history.

(56) References Cited

U.S. PATENT DOCUMENTS

| | | | | |
|---|---|---|---|---|
| 5,269,585 A | * | 12/1993 | Klages | B62D 29/008 296/205 |
| 8,163,116 B2 | * | 4/2012 | Riley | B62D 27/023 296/205 |
| 2007/0281523 A1 | | 12/2007 | Riley | |
| 2017/0166259 A1 | | 6/2017 | Kim et al. | |
| 2019/0106152 A1 | | 4/2019 | Choi et al. | |
| 2021/0179196 A1 | * | 6/2021 | Kim | B62D 27/023 |

FOREIGN PATENT DOCUMENTS

| | | |
|---|---|---|
| JP | 3791071 B2 | 6/2006 |
| JP | 2007030720 A | 2/2007 |
| JP | 2007333208 A | 12/2007 |
| KR | 101199050 B1 | 11/2012 |
| KR | 20170070571 A | 6/2017 |
| KR | 20210053013 A | 5/2021 |
| KR | 20210076588 A | 6/2021 |
| KR | 102383247 B1 | 4/2022 |

* cited by examiner

*Primary Examiner* — Dennis H Pedder
(74) *Attorney, Agent, or Firm* — Slater Matsil, LLP

(57) ABSTRACT

A body for a vehicle is proposed. The body includes an A pillar upper member supporting a front glass of the vehicle, an A pillar lower member disposed under the A pillar upper member and extending in a vertical direction of the vehicle, a cowl cross member extending in a width direction of the vehicle, and a joint provided on a front side of a vehicle cockpit, provided between a lower end of the A pillar upper member, an upper end of the A pillar lower member, and an end of the cowl cross member, and connected to each of the lower end of the A pillar upper member, the upper end of the A pillar lower member, and the end of the cowl cross member to form a load path.

20 Claims, 8 Drawing Sheets

BODY FOR VEHICLE

CROSS-REFERENCE TO RELATED APPLICATIONS

The present application claims priority to Korean Patent Application No. 10-2022-0145272, filed Nov. 3, 2022, the overall contents of which are incorporated herein for all purposes by this reference.

TECHNICAL FIELD

The present invention relates to a body for a vehicle.

BACKGROUND

A Purpose Built Vehicle (PBV) may include a life module that defines various types of boarding and loading spaces according to market needs and a drive module related to the actual driving of the vehicle. By combining the common drive module with life modules according to various needs, it is possible to easily produce various types of vehicles and thereby very effectively respond to the market flow of small quantity batch production.

Meanwhile, pillars included in a body frame of the vehicle are divided into a front pillar (A pillar), a center pillar (B pillar), and a rear pillar (C pillar) according to their locations, and not only serve to support a roof of the vehicle but also to improve the rigidity and stability of the body.

However, in the conventional case, each pillar is formed of the flange-to-flange coupling of an inner panel and an outer panel, and a cowl portion included in the body frame is also formed of a panel. Thus, there is a problem of having a structure that is vulnerable to secure the rigidity of the corner portion due to the connection between the panels when connecting each pillar and the cowl.

Recently, a vehicle with the body frame suitable for various purposes of the vehicle is being developed. For example, a vehicle to which a box-type body frame with improved internal space utilization is applied is being developed. Accordingly, in the case of the vehicle with the box-type body frame, it is important to secure the rigidity of each corner portion as a glass area is enlarged and a total height is increased compared to the conventional vehicle.

The foregoing is intended merely to aid in the understanding of the background of the present invention, and is not intended to mean that the present invention falls within the purview of the related art that is already known to those skilled in the art.

SUMMARY

Embodiments of the present invention relate to a body for a vehicle, the body having a joint on a front side to ensure rigidity of a corner portion of the vehicle.

Accordingly, embodiments of the present invention has been made keeping in mind the above problems occurring in the related art, and an objective of the present invention is to provide a body for a vehicle, which has a joint on a front side of the vehicle, thus ensuring rigidity of a front corner portion.

The objectives of the present invention are not limited to the above-mentioned objectives, and other objectives which are not mentioned will be clearly understood by those skilled in the art from the following description.

In order to achieve the objective of the present invention, embodiments of the present invention provides a body for a vehicle, including an A pillar upper member supporting a front glass of the vehicle, an A pillar lower member disposed under the A pillar upper member and extending in a vertical direction of the vehicle, a cowl cross member extending in a width direction of the vehicle, and a joint provided on a front side of a vehicle cockpit, provided between a lower end of the A pillar upper member, an upper end of the A pillar lower member, and an end of the cowl cross member, and connected to each of the lower end of the A pillar upper member, the upper end of the A pillar lower member, and the end of the cowl cross member to form a load path.

In an embodiment, the joint may have a shape of a plate-like panel that protrudes outwards to define an internal space, and a plurality of ribs protruding to the internal space may be formed on an inner surface of the joint.

In an embodiment, a through hole in which a front quarter glass is mounted may be formed in the joint, and the joint may have a shape of a member in which a portion except for the through hole has a closed section structure, and a plurality of ribs may be formed in the member.

In an embodiment, the joint may have a plate-like panel shape, and may further include a plurality of connectors protruding to be connected to the lower end of the A pillar upper member, the upper end of the A pillar lower member, and the end of the cowl cross member, respectively. Each of the connectors may be formed to have a closed section.

In an embodiment, the joint may have a triangular plate-like panel shape, may be connected to the lower end of the A pillar upper member through the protruding first connector while having an inclination in an upper direction of the vehicle from one vertex, may be connected to the upper end of the A pillar lower member through the second connector that protrudes in a lower direction of the vehicle from a vertex that is near to the first connector among the remaining two vertices, and may be connected to the end of the cowl cross member through the third connector protruding in an inward direction of the vehicle from the remaining vertex.

In an embodiment, any one of the plurality of connectors may include a first part and a second part that protrude from the joint to have different extended lengths.

In an embodiment, an inner surface of any one of the lower end of the A pillar upper member, the upper end of the A pillar lower member, and the end of the cowl cross member connected to any one of the connectors may contact an outer surface of the first part of the connector, and an outer surface thereof may contact an inner surface of the second part of the connector.

In an embodiment, the outer surface of the first part may be covered by an extension extending from an end of a corresponding member among the lower end of the A pillar upper member, the upper end of the A pillar lower member, and the end of the cowl cross member.

In an embodiment, the second part may extend toward an end of a corresponding member among the lower end of the A pillar upper member, the upper end of the A pillar lower member, and the end of the cowl cross member to cover an outer surface of the end of the corresponding member.

In an embodiment, each of the lower end of the A pillar upper member and the upper end of the A pillar lower member may be connected to the first part and the second part of a corresponding connector through surface bonding in an inward direction of the vehicle.

In an embodiment, the end of the cowl cross member may be connected to the first part and the second part of the corresponding connector through surface bonding in a lower direction of the vehicle.

In an embodiment, the body may further include a B pillar supporting a roof of the vehicle, and a rigidity reinforcement member perpendicularly connected to the B pillar and extending in a longitudinal direction of the vehicle. An end of the rigidity reinforcement member may be connected to the joint.

In an embodiment, a connector protruding in a rear direction of the vehicle may be formed on the joint, a portion of an inner surface of the end of the rigidity reinforcement member may be connected to an outer surface of the connector, and a portion of an outer surface of the end of the rigidity reinforcement member may be connected to an inner surface of the connector.

According to a body for a vehicle of the present invention, a joint is provided on a front side of the vehicle, and the joint is connected to each of a lower end of an A pillar upper member, an upper end of an A pillar lower member, and an end of a cowl cross member through surface bonding, thus improving connectivity, and securing the rigidity of the front side or corner portion of a box-type vehicle.

The present invention is not limited to the above-mentioned effects. Other effects of the present invention will be clearly understood by those skilled in the art from the following description.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF ILLUSTRATIVE EMBODIMENTS

Figure 1:
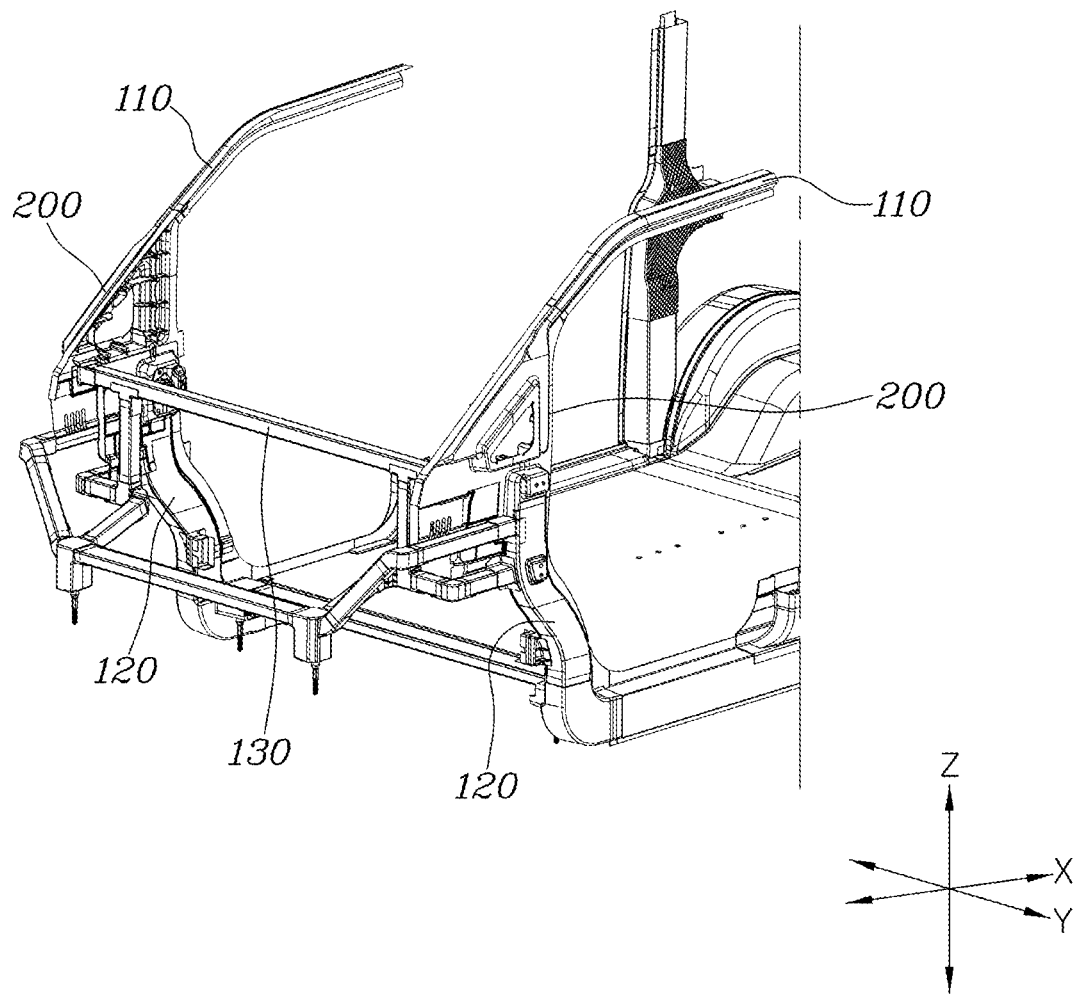
FIG. 1 is a perspective view illustrating a body for a vehicle according to an embodiment of the present invention.

When it is determined that the detailed description of the known art related to the present invention may be obscure the gist of the invention, the detailed description thereof will be omitted. Further, it is to be understood that the accompanying drawings are merely for making those skilled in the art easily understand embodiments disclosed herein, and the present invention is intended to cover not only embodiments disclosed herein, but also various alternatives, equivalents, or substitutes that fall within the spirit and scope of the present invention.

Although the terms "first," "second," etc. may be used herein to describe various elements, these elements should not be limited by these terms. These terms are only used to distinguish one element from another element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present.

Herein, the singular forms are intended to include the plural forms as well, unless the context clearly indicates otherwise.

It will be further understood that the terms "comprise", "include", "have", etc. when used in this specification, specify the presence of stated features, integers, steps, operations, elements, components, and/or combinations thereof but do not preclude the presence or addition of one or more other features, integers, steps, operations, elements, components, and/or combinations thereof.

Hereinafter, the embodiments of the present invention will be described in detail with reference to the accompanying drawings. The same reference numerals are used throughout the drawings to designate the same or similar components.

A body for a vehicle may be configured in various forms depending on the purpose of use. Hereinafter, FIGS. 1 to 6 describe the configuration of a body for a vehicle in which a door may be applied to a passenger seat side as well as a vehicle cockpit according to an embodiment of the present invention, while FIGS. 7 and 8 describe the configuration of a body for a vehicle in which a door is not applied to a passenger seat side according to another embodiment of the present invention.

Hereinafter, the body for the vehicle according to an embodiment of the present invention will be described with reference to FIG. 1.

FIG. 1 is a perspective view illustrating a body for a vehicle according to an embodiment of the present invention.

Referring to FIG. 1, the body for the vehicle may include an A pillar upper member no that supports a front glass of the vehicle, an A pillar lower member 120 that is disposed under the A pillar upper member 110 and extends in a vertical direction of the vehicle, a cowl cross member 130 that extends in a width direction of the vehicle, and a joint 200 that is provided on the front side of a vehicle cockpit and is provided between a lower end of the A pillar upper member no, an upper end of the A pillar lower member 120, and an end of the cowl cross member 130. Further, the joint 200 may be connected to each of the lower end of the A pillar upper member no, the upper end of the A pillar lower member 120, and the end of the cowl cross member 130 to form a load path.

The joint 200 may be provided on the front side of the vehicle cockpit as well as the front side of the vehicle passenger seat. However, since the body for the vehicle according to an embodiment of the present invention includes the joint 200 having the same shape and function, only the joint 200 provided on the front side of the vehicle cockpit will be described.

Further, the joint 200 according to an embodiment of the present invention may be made of a plastic material or an aluminum material. In the case of the plastic material, the joint 200 may be made through injection molding. In the case of the aluminum material, the joint 200 may be made through a casting operation. However, this is merely illustrative, and various materials other than the above-described material may be applied to the joint 200.

Hereinafter, the specific shape of the joint 200 will be described with reference to FIGS. 2 to 4.

Figure 2:
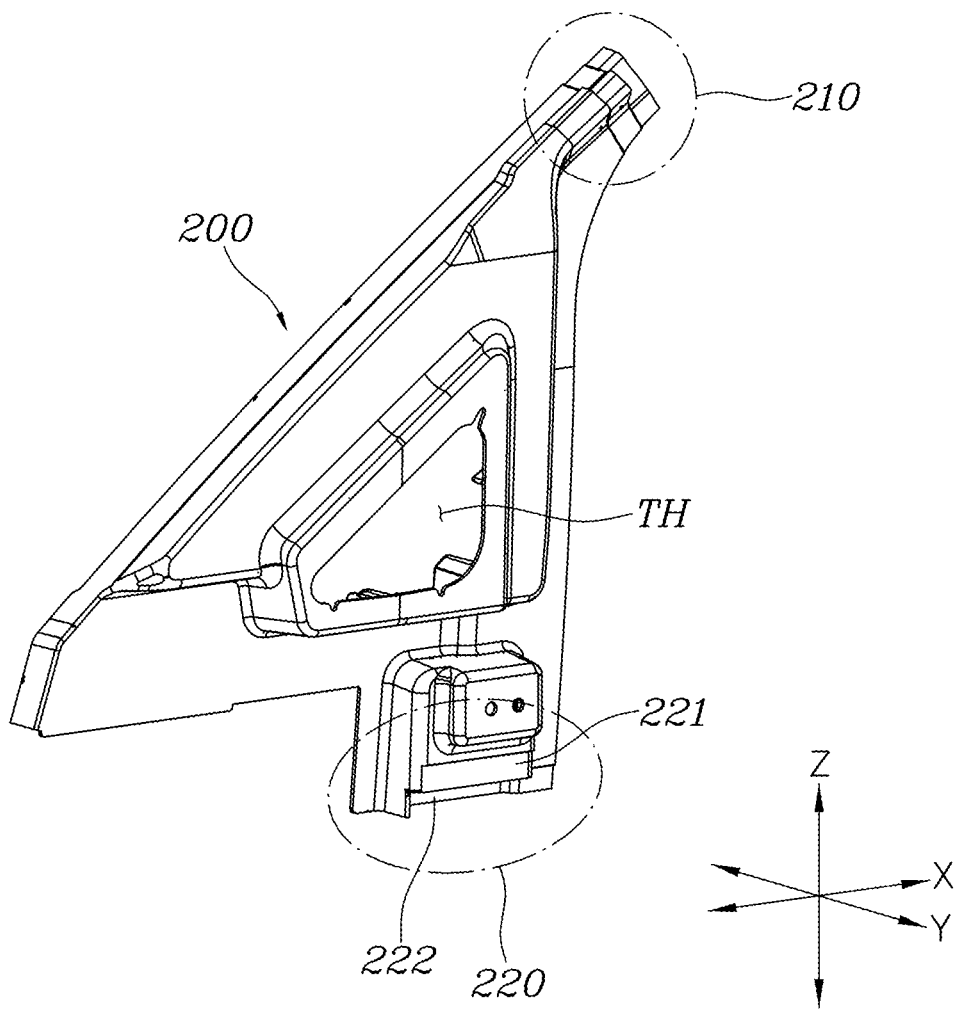
FIGS. 2 to 4 are perspective views illustrating the shape of a joint according to an embodiment of the present invention.
Figure 3:
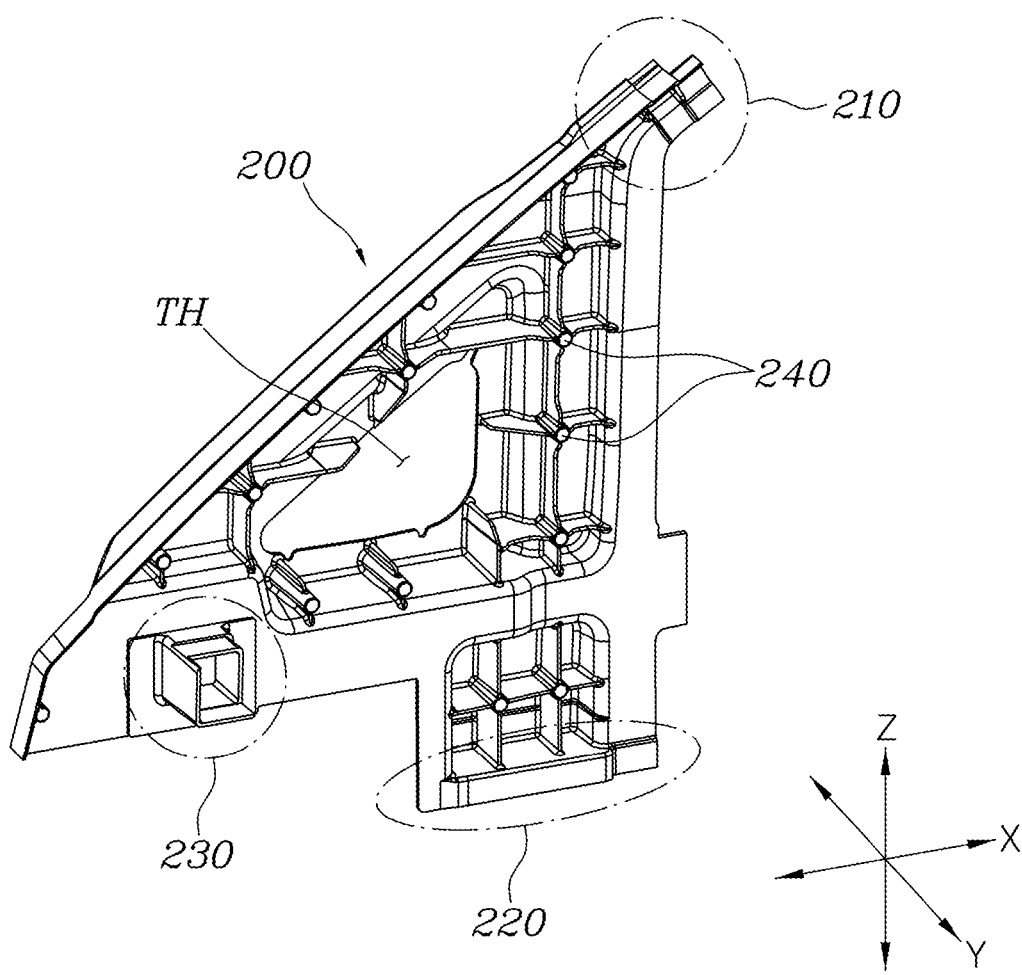
Figure 4:
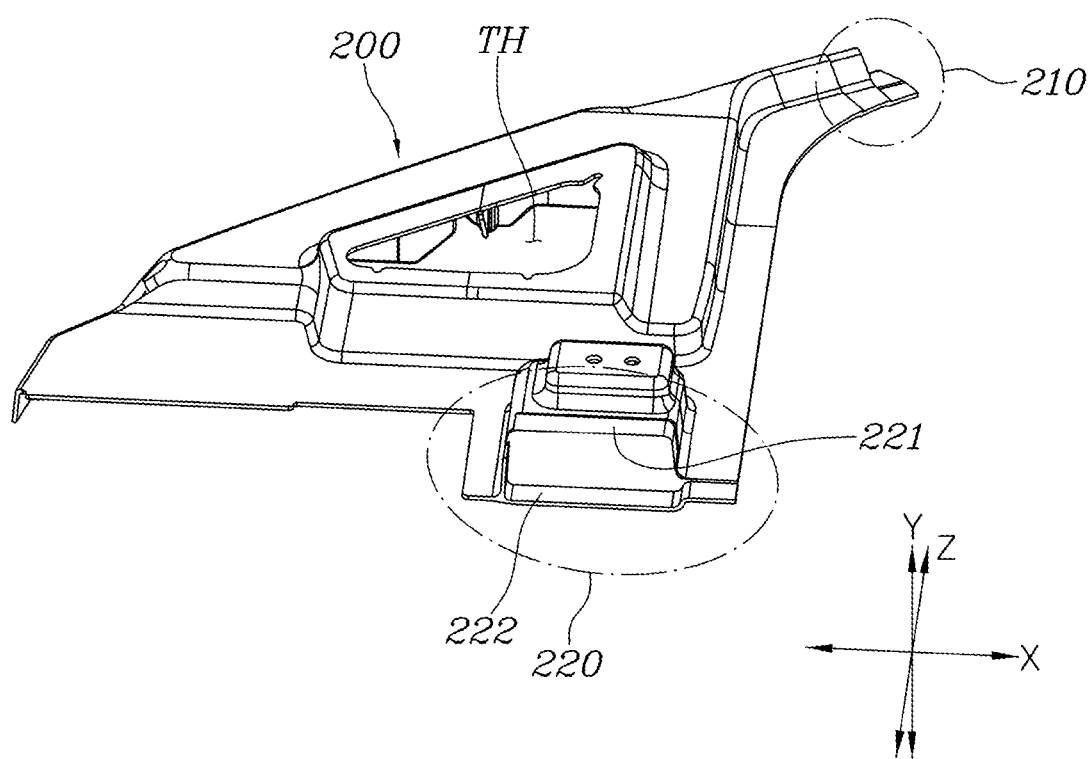

FIGS. 2 to 4 are perspective views illustrating the shape of the joint according to an embodiment of the present invention.

Referring to FIGS. 2 to 4, the joint 200 may have a plate-like panel shape in which a through hole TH in which a front quarter glass mounted to secure a driver's clear view is installed is formed. The joint 200 may have the shape of the plate-like panel that protrudes outwards to define an internal space, and a plurality of ribs 240 protruding to the internal space may be formed on the inner surface of the joint 200. In an embodiment of the present invention, the joint 200 may have the plate-like panel shape, and the plurality of ribs 240 may be formed on the inner surface of the joint so as to increase the rigidity of the joint 200 itself.

As described above, the joint 200 may have the plate-like panel shape. However, according to another embodiment, portions other than the through hole TH in which the front quarter glass is installed may be formed in the shape of a member having a closed section structure. Further, a plurality of ribs 240 may be formed in a member having a closed section structure of a joint 200 according to another embodiment. Thus, the joint 200 of the shape of the member having the closed section structure may secure rigidity higher than that of the joint 200 of the plate-like panel shape having an open section structure.

However, the joint 200 according to the above-described embodiment of the present invention may be variously changed in configuration and shape when applied to an actual vehicle body, as in other embodiments.

Further, the joint 200 may include a plurality of connectors 210, 220, and 230 that are connected to the lower end of the A pillar upper member no, the upper end of the A pillar lower member 120, and the end of the cowl cross member 130, respectively. The connectors may be formed to have the closed section. For instance, it is assumed herein that the joint 200 according to an embodiment has a triangular plate-like panel shape for the convenience of description. However, this is merely illustrative, and the joint 200 applied to the body of the vehicle may have various shapes other than the above-mentioned shape.

Hereinafter, assuming that the joint 200 has the triangular plate-like panel shape, the plurality of connectors 210, 220, and 230 formed on the joint 200 will be described.

Among the plurality of connectors 210, 220, and 230, the first connector 210 may be located at one vertex of the joint 200. The first connector 210 may extend in the upper direction (Z direction) of the vehicle while having an inclination from one vertex of the triangular joint 200, and the joint 200 may be connected to the lower end of the A pillar upper member no through the extended first connector 210.

The second connector 220 may be located on a side facing the first connector 210, and may be located at a vertex that is near to the vertex at which the first connector 210 is formed. The second connector 220 may extend in the lower direction (Z direction) of the vehicle, and the joint 200 may be connected to the upper end of the A pillar lower member 120 through the extended second connector 220.

The third connector 230 may be located at a vertex other than the vertices at which the first connector 210 and the second connector 220 are formed. The third connector 230 may extend in the inward direction (Y direction) of the vehicle from the inner surface of the joint 200, and the joint 200 may be connected to the end of the cowl cross member 130 through the extended third connector 230.

The related art is problematic in that the A pillar upper member no, the A pillar lower member 120, and the cowl cross member 130 are connected to be secured to the joint 200 of the plate-like panel shape, so that connectivity with the joint 200 may be deteriorated. In contrast, according to the present invention, the plurality of connectors 210, 220, and 230 each having the closed section are formed on the joint 200, so connectivity with the A pillar upper member no, the A pillar lower member 120, and the cowl cross member 130 may be enhanced.

On the other hand, any one of the plurality of connectors 210, 220, and 230 formed on the joint 200 may include a first part and a second part that protrude from the joint 200 to have different extended lengths. In an embodiment of the present invention, it is assumed that all of the plurality of connectors 210, 220, and 230 have the first and second parts. This will be described below with reference to FIGS. 5 and 6.

Figure 5:
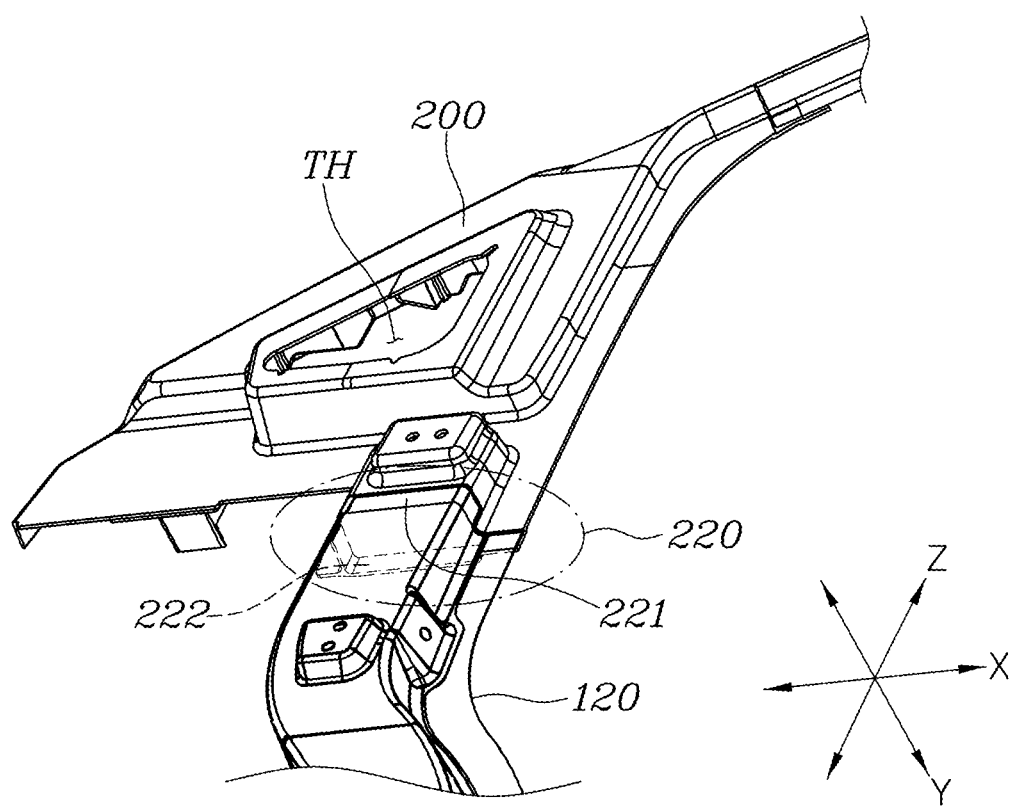
FIGS. 5 and 6 are perspective views illustrating various members connected to the joint according to an embodiment of the present invention.
Figure 6:
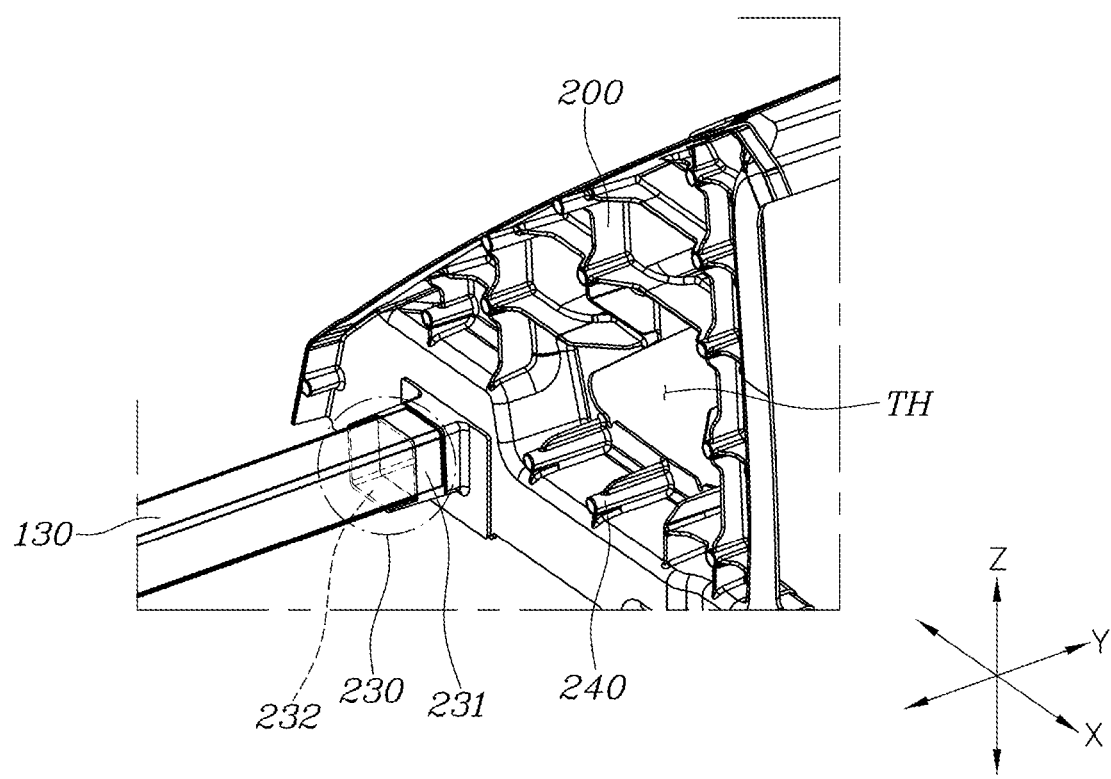

FIGS. 5 and 6 are perspective views illustrating various members connected to the joint according to an embodiment of the present invention.

First, the upper end of the A pillar lower member 120 connected to the joint 200 will be described with reference to FIG. 5. Hereinafter, the description of the connection between the lower end of the A pillar upper member no and the joint 200 is omitted. However, since the lower end of the A pillar upper member no and the upper end of the A pillar lower member 120 are connected to different connectors when they are connected to the joint 200 but adopt the same connecting method, it is to be understood that the connection between the lower end of the A pillar upper member and the joint is performed in the same manner as the connection between the upper end of the A pillar lower member 120 and the joint 200.

Further, for the convenience of description, it is assumed that the joint 200 according to an embodiment of the present invention has a rectangular closed section, and each of the A pillar upper member no, the A pillar lower member 120, and the cowl cross member 130 also has a rectangular closed section.

Referring to FIG. 5, the second connector 220 may include a first part 221 and a second part 222 having different extended lengths. Further, a portion of the inner surface of the upper end of the A pillar lower member 120 connected to the second connector 220 may contact the outer surface of the first part 221, while a portion of the outer surface thereof may contact the inner surface of the second part 222.

To be more specific, when the closed section of the second connector 220 has a rectangular shape, the first part 221 may be formed in the outward direction (Y direction) and the rear direction (X direction) of the vehicle, while the second part 222 may be formed in the inward direction (Y direction) and the front direction (X direction) of the vehicle. Due to the shape of the second connector 220, the shape of the upper end of the A pillar lower member 120 connected thereto may also be changed. An extension extending toward the second connector 220 may be formed on a portion of the upper end of the A pillar lower member 120, and the outer surface of the first part 221 of the second connector 220 may be covered by the extension extending from a portion of the upper end of the A pillar lower member 120.

Similarly, the second part 222 of the second connector 220 may extend toward the upper end of the A pillar lower member 120, and the extended second part 222 may cover the outer surface of the upper end of the A pillar lower member 120. Thus, the upper end of the A pillar lower member 120 may be connected to the second connector 220 by surface bonding, thereby increasing coupling rigidity when the A pillar lower member 120 and the joint 200 are connected to each other.

Further, due to such a shape, the upper end of the A pillar lower member 120 may be connected to the second connector 220 in the inward direction (Y direction) of the vehicle from the side of the vehicle. This makes it easy to connect the A pillar lower member 120 and the joint 200, thus securing connectivity and coupling rigidity by surface bonding.

Referring to FIG. 6, the third connector 230 may include a first part 231 and a second part 232 having different extended lengths. Further, a portion of the inner surface of the end of the cowl cross member 130 connected to the third connector 230 may contact the outer surface of the first part 231, while a portion of the outer surface thereof may contact the inner surface of the second part 232.

To be more specific, when the closed section of the third connector 230 has a rectangular shape, the first part 231 may be formed in the upper direction (Z direction) and the rear direction (X direction) of the vehicle, while the second part 232 may be formed in the lower direction (Z direction) and the front direction (X direction) of the vehicle. Due to the shape of the third connector 230, the shape of the end of the cowl cross member 130 connected thereto may also be changed. An extension extending toward the third connector 230 may be formed on a portion of the end of the cowl cross member 130, and the outer surface of the first part 231 of the third connector 230 may be covered by the extension extending from a portion of the end of the cowl cross member 130.

Similarly, the second part 232 of the third connector 230 may extend toward the end of the cowl cross member 130, and the extended second part 232 may cover the outer surface of the end of the cowl cross member 130. Thus, the end of the cowl cross member 130 may be connected to the third connector 230 by surface bonding, thereby increasing coupling rigidity when the cowl cross member 130 and the joint 200 are connected to each other.

Further, due to the shape of the end of the cowl cross member 130 and the third connector 230, the end of the cowl cross member 130 may be connected to the third connector 230 in the lower direction (Z direction) from the upper portion of the vehicle. This makes it easy to connect the cowl cross member 130 and the joint 200, thus securing connectivity and coupling rigidity by surface bonding.

However, this is merely illustrative, and various connecting methods may be present between the plurality of connectors 210, 220, and 230, the A pillar upper member no, the A pillar lower member 120, and the cowl cross member 130.

In summary, due to the shape of the plurality of connectors 210, 220, and 230 provided on the joint 200, the lower end of the A pillar upper member 110, the upper end of the A pillar lower member 120, and the end of the cowl cross member 130 may be connected at four sides thereof to the corresponding connectors. Due to the shape of the plurality of connectors 210, 220, and 230 of the joint 200, the A pillar upper member no, the A pillar lower member 120, and the cowl cross member 130 may be connected not by a surface bonding method but by a fitting method. However, the fitting method is problematic in that a coupling direction is fixed when each member is connected to the joint 200, so that connectivity is deteriorated. Therefore, according to the present invention, the plurality of connectors 210, 220, and 230 each have the shape of a closed section, and are connected to the lower end of the A pillar upper member no, the upper end of the A pillar lower member 120, and the end of the cowl cross member 130 through a surface bonding method, thus improving connectivity and simultaneously increasing coupling rigidity.

Hereinafter, a body for a vehicle according to another embodiment of the present invention will be described with reference to FIGS. 7 and 8. Further, in FIGS. 7 and 8, the joint 200 provided on the front side of the vehicle passenger seat will be mainly described.

Figure 7:
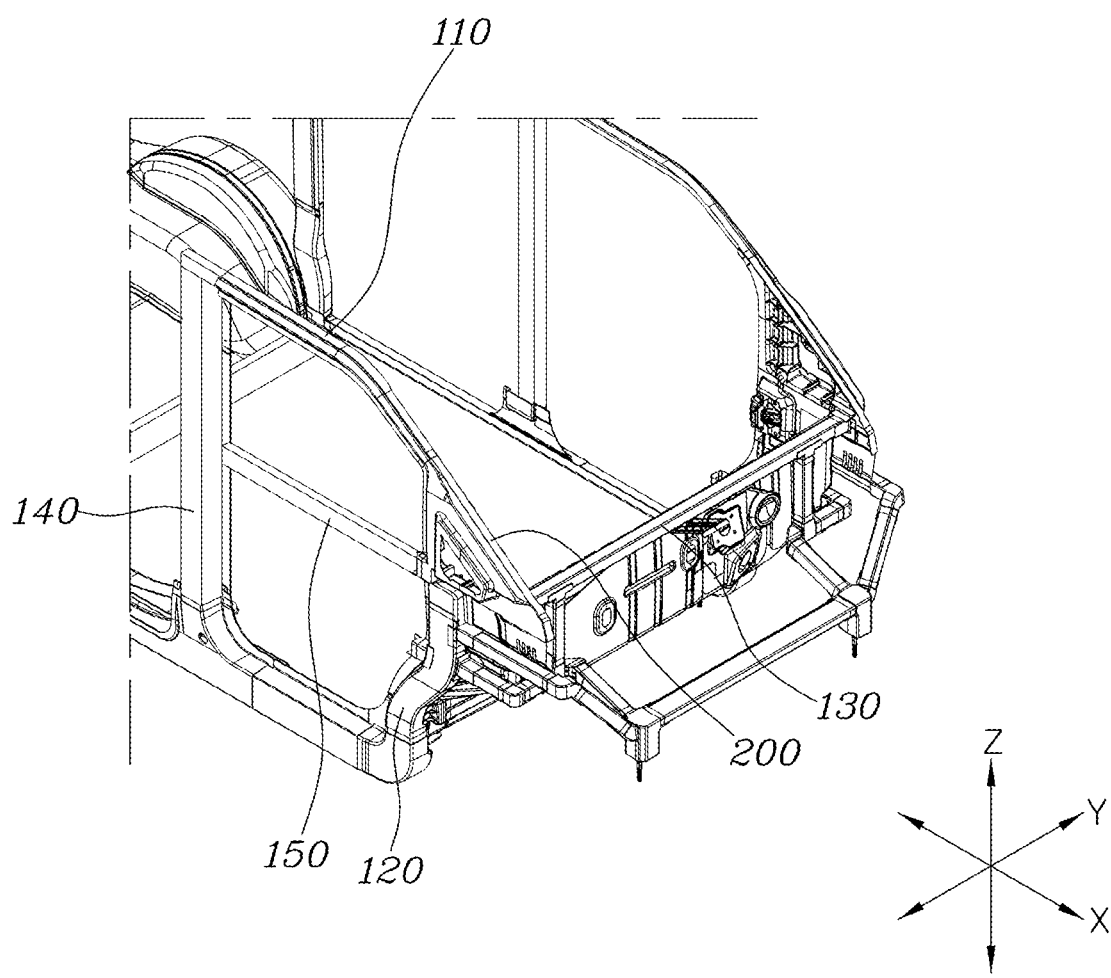
FIG. 7 is a perspective view illustrating a body for a vehicle including a rigidity reinforcement member according to another embodiment of the present invention.

FIG. 7 is a perspective view illustrating a body for a vehicle including a rigidity reinforcement member according to another embodiment of the present invention.

Referring to FIG. 7, the vehicle may not include the door of the passenger seat depending on the purpose of use, and may be problematic in that the passenger seat door is not present in the process of manufacturing the body for the vehicle, so that side rigidity is deteriorated. In order to solve this problem, the body for the vehicle according to another embodiment of the present invention may further include a B pillar 140 that supports a roof of the vehicle, and a rigidity reinforcement member 150 that is perpendicularly connected to the B pillar 140 and extends in the longitudinal direction (X direction) of the vehicle.

In addition, the rigidity reinforcement member 150 may be formed to have a closed section, and an end of the rigidity reinforcement member 150 may be connected to the joint 200. This will be described with reference to FIG. 8.

Figure 8:
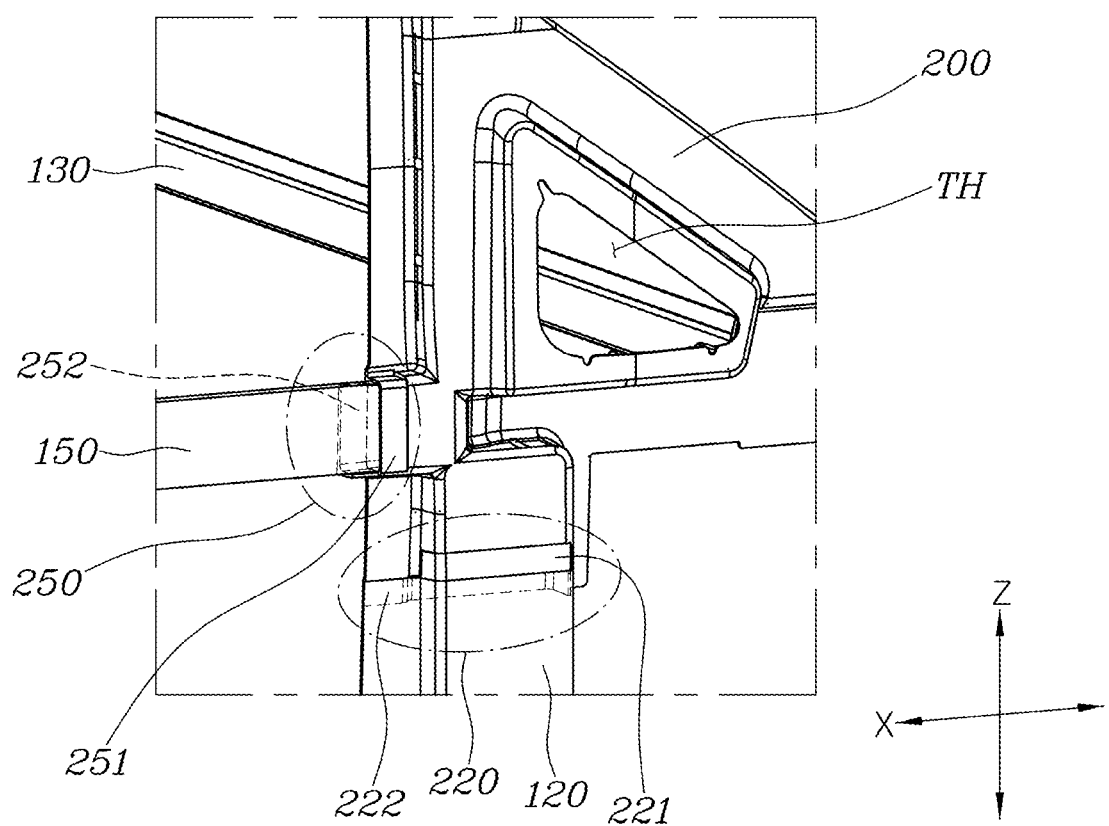
FIG. 8 is a perspective view illustrating a joint connected to the rigidity reinforcement member according to another embodiment of the present invention.

FIG. 8 is a perspective view illustrating a joint connected to the rigidity reinforcement member according to another embodiment of the present invention.

Referring to FIG. 8, a connector 250 protruding in the rear direction (X direction) of the vehicle may be formed on the joint 200, and the end of the rigidity reinforcement member 150 may be connected through the connector 250 to the joint 200. When the joint 200 has the structure described above with reference to FIGS. 1 to 6, the connector 250 protruding in the rear direction (X direction) of the vehicle may be referred to as a fourth connector 250, and the fourth connector 250 may be located between the first connector 210 and the second connector 220 and be formed to protrude in the rear direction (X direction) of the vehicle.

Further, the fourth connector 250 may be formed in a shape similar to those of the plurality of connectors 210, 220, and 230 that have been described above. For example, the fourth connector 250 may be formed to have a closed section, and the fourth connector 250 may include a first part 251 and a second part 252 that protrude from the joint 200 toward the rigidity reinforcement member 150 and have different extended lengths.

Due to such a shape, a portion of the inner surface of the end of the rigidity reinforcement member 150 may be bonded to the outer surface of the first part 251 of the fourth connector 250, and a portion of the outer surface of the end of the rigidity reinforcement member 150 may be bonded to the inner surface of the second part 252 of the fourth connector 250. The rigidity reinforcement member 150 may be connected to the fourth connector 250 by surface bonding, thereby improving connectivity between the joint 200 and the rigidity reinforcement member 150 and increasing coupling rigidity.

Although the present invention was described with reference to specific embodiments shown in the drawings, it is apparent to those skilled in the art that the present invention may be changed and modified in various ways without departing from the scope of the present invention, which is described in the following claims.

What is claimed is:

1. A body for a vehicle, the body comprising:
   an A pillar upper member configured to support a front glass of the vehicle;
   an A pillar lower member disposed under the A pillar upper member and extending in a vertical direction of the vehicle;
   a cowl cross member extending in a width direction of the vehicle; and
   a joint provided on a front side of a vehicle cockpit between a lower end of the A pillar upper member, an upper end of the A pillar lower member, and an end of the cowl cross member, wherein the joint is connected to each of the lower end of the A pillar upper member, the upper end of the A pillar lower member, and the end of the cowl cross member to form a load path, wherein a through hole is formed in the joint so that a front quarter glass can be mounted therein, wherein the joint has a shape of a member in which a portion has a closed section structure except for the through hole, and wherein the member comprises a plurality of ribs.

2. The body of claim 1, wherein the shape of the member is a plate-like panel that protrudes outwards to define an internal space and wherein the plurality of ribs are formed on an inner surface of the joint and protrude into the internal space.

3. The body of claim 1, wherein the joint has a plate-like panel shape and further comprises a plurality of connectors protruding from the joint, wherein the plurality of connectors are configured to be connected to the lower end of the A pillar upper member, the upper end of the A pillar lower member, and the end of the cowl cross member, and wherein the plurality of connectors are formed to have a closed section.

4. The body of claim 3, wherein the joint is connected to the lower end of the A pillar upper member through a protruding first connector while having an inclination in an upper direction of the vehicle from a first vertex, wherein the joint is connected to the upper end of the A pillar lower member through a second connector that protrudes in a lower direction of the vehicle from a second vertex, and wherein the joint is connected to the end of the cowl cross member through a third connector protruding in an inward direction of the vehicle from a third vertex.

5. The body of claim 3, wherein any one of the plurality of connectors comprises a first part and a second part that protrude from the joint to have different extended lengths.

6. The body of claim 5, wherein an inner surface of any one of the lower end of the A pillar upper member, the upper end of the A pillar lower member, or the end of the cowl cross member connected to a corresponding one of the connectors contacts an outer surface of the first part of the connector, and an outer surface of any one of the lower end of the A pillar upper member, the upper end of the A pillar lower member, or the end of the cowl cross member contacts an inner surface of the second part of the corresponding connector.

7. The body of claim 5, wherein an outer surface of the first part of the connector is covered by an extension extending from an end of a corresponding member among the lower end of the A pillar upper member, the upper end of the A pillar lower member, and the end of the cowl cross member.

8. The body of claim 5, wherein the second part extends toward an end of a corresponding member among the lower end of the A pillar upper member, the upper end of the A pillar lower member, and the end of the cowl cross member to cover an outer surface of the end of the corresponding member.

9. The body of claim 6, wherein each of the lower end of the A pillar upper member and the upper end of the A pillar lower member is connected to the first part and the second part of a corresponding connector through surface bonding in a direction from an outside to an inside of the vehicle.

10. The body of claim 6, wherein the end of the cowl cross member is connected to the first part and the second part of a corresponding connector through surface bonding in a lower direction of the vehicle.

11. A body for a vehicle, the body comprising:
    an A pillar upper member configured to support a front glass of the vehicle;
    an A pillar lower member disposed under the A pillar upper member and extending in a vertical direction of the vehicle;
    a cowl cross member extending in a width direction of the vehicle;
    a joint provided on a front side of a vehicle cockpit between a lower end of the A pillar upper member, an upper end of the A pillar lower member, and an end of the cowl cross member, wherein the joint is connected to each of the lower end of the A pillar upper member, the upper end of the A pillar lower member, and the end of the cowl cross member to form a load path and wherein the joint comprises a connector that protrudes in a rear direction of the vehicle;
    a B pillar supporting a roof of the vehicle; and
    a rigidity reinforcement member perpendicularly connected to the B pillar and extending in a longitudinal direction of the vehicle, wherein an end of the rigidity reinforcement member is connected to the joint, a portion of an inner surface of the end of the rigidity reinforcement member is connected to an outer surface of the connector, and a portion of an outer surface of the end of the rigidity reinforcement member is connected to an inner surface of the connector.

12. The body of claim 11, wherein the joint has a shape of a plate-like panel that protrudes outwards to define an internal space and wherein the joint has a plurality of ribs protruding to the internal space is formed on an inner surface of the joint that protrude into the internal space.

13. The body of claim 11, wherein a through hole is formed in the joint so that a front quarter glass can be mounted therein, wherein the joint has a shape of a member in which a portion has a closed section structure except for the through hole, and wherein the member comprises a plurality of ribs.

14. The body of claim 11, wherein the joint has a plate-like panel shape and further comprises a plurality of connectors protruding from the joint, wherein the plurality of connectors are configured to be connected to the lower end of the A pillar upper member, the upper end of the A pillar lower member, and the end of the cowl cross member, and wherein the plurality of connectors are formed to have a closed section.

15. The body of claim 14,
    wherein the joint is connected to the lower end of the A pillar upper member through a protruding first connector while having an inclination in an upper direction of the vehicle from a first vertex;
    wherein the joint is connected to the upper end of the A pillar lower member through a second connector that protrudes in a lower direction of the vehicle from a second vertex; and wherein the joint is connected to the end of the cowl cross member through a third connector protruding in an inward direction of the vehicle from a third vertex.

16. The body of claim 14, wherein any one of the plurality of connectors comprises a first part and a second part that protrude from the joint to have different extended lengths.

17. A body for a vehicle, the body comprising:
- an A pillar upper member configured to support a front glass of the vehicle;
- an A pillar lower member disposed under the A pillar upper member and extending in a vertical direction of the vehicle;
- a cowl cross member extending in a width direction of the vehicle; and
- a joint comprising a closed portion having a plurality of ribs and a through hole so that a front quarter glass can be mounted therein, wherein the joint is provided on a front side of a vehicle cockpit and connected to a lower end of the A pillar upper member through a protruding first connector while having an inclination in an upper direction of the vehicle from a first vertex, an upper end of the A pillar lower member through a second connector that protrudes in a lower direction of the vehicle from a second vertex, and an end of the cowl cross member through a third connector protruding in an inward direction of the vehicle from a third vertex, wherein the joint is connected to each of the lower end of the A pillar upper member, the upper end of the A pillar lower member, and the end of the cowl cross member to form a load path.

18. The body of claim 17, wherein each of the first connector, the second connector, and the third connector comprises a first part and a second part that protrude from the joint to have different extended lengths.

19. The body of claim 18, wherein an inner surface of the lower end of the A pillar upper member contacts an outer surface of the first part of the first connector and an outer surface of the lower end of the A pillar upper member contacts an inner surface of the second part of the first connector, an inner surface of the upper end of the A pillar lower member contacts an outer surface of the first part of the second connector and an outer surface of the upper end of the A pillar lower member contacts an inner surface of the second part of the second connector, and an inner surface of the end of the cowl cross member contacts an outer surface of the first part of the third connector and an outer surface of the end of the cowl cross member contacts an inner surface of the second part of the third connector.

20. The body of claim 18, wherein an outer surface of the first part of each of the first, second, and third connectors is covered by an extension extending from an end of a corresponding member among the lower end of the A pillar upper member, the upper end of the A pillar lower member, and the end of the cowl cross member.

* * * * *

UNITED STATES PATENT AND TRADEMARK OFFICE
CERTIFICATE OF CORRECTION

PATENT NO. : 12,491,947 B2  
APPLICATION NO. : 18/178971  
DATED : December 9, 2025  
INVENTOR(S) : Kang et al.

Page 1 of 1

It is certified that error appears in the above-identified patent and that said Letters Patent is hereby corrected as shown below:

In the Claims

In Column 10, in Claim 12, Line 43, delete "protruding to the internal space is formed" and insert -- formed --.

Signed and Sealed this  
Third Day of February, 2026

John A. Squires  
*Director of the United States Patent and Trademark Office*